April 23, 1963 W. B. ABBOTT ETAL 3,086,644
HYDRAULIC MAGAZINE SHIFTING DEVICE FOR
TYPOGRAPHICAL COMPOSING MACHINES
Filed April 26, 1961 6 Sheets-Sheet 1

Fig. 1.

INVENTORS.
WILLIAM B. ABBOTT
HERBERT KLEPPER
MATTHEW F. MARSICANO
BY
ATTORNEY

April 23, 1963
W. B. ABBOTT ETAL
3,086,644
HYDRAULIC MAGAZINE SHIFTING DEVICE FOR
TYPOGRAPHICAL COMPOSING MACHINES
Filed April 26, 1961
6 Sheets-Sheet 2

Fig. 2.

INVENTORS.
WILLIAM B. ABBOTT
HERBERT KLEPPER
MATTHEW F. MARSICANO
BY
ATTORNEY

INVENTORS.
WILLIAM B. ABBOTT
HERBERT KLEPPER
MATTHEW F. MARSICANO
BY
ATTORNEY

INVENTORS.
WILLIAM B. ABBOTT
HERBERT KLEPPER
BY MATTHEW F. MARSICANO
ATTORNEY

United States Patent Office 3,086,644
Patented Apr. 23, 1963

3,086,644
HYDRAULIC MAGAZINE SHIFTING DEVICE FOR TYPOGRAPHICAL COMPOSING MACHINES
William B. Abbott, Baldwin, Herbert Klepper, Brooklyn, and Matthew F. Marsicano, Forest Hills, N.Y., assignors to Mergenthaler Linotype Company, a corporation of New York
Filed Apr. 26, 1961, Ser. No. 105,621
19 Claims. (Cl. 199—45)

This invention relates to typographical composing machines, such as linecasting machines of the general organization represented in United States Letters Patent No. 436,532, wherein circulating matrices are released from a magazine in the order in which their characters are to appear in print and then assembled in line, the composed line transferred to the face of a mold, the mold filled with molten metal to form a slug against the matrices which produce the type characters thereon, and the matrices thereafter elevated and returned through distributing mechanism to the magazine from which they started.

More particularly, it relates to machines equipped with a plurality of superposed magazines containing different matrix fonts which are arranged to be moved as a unit upwardly and downwardly in the machine to bring one or another into operative relation to the assembling and distributing mechanisms. In such machines, the magazines are independently removable and replaceable and, to this end, are arranged to be spread apart in order to permit access to the magazine to be removed which, for this purpose, is first located in operative position.

The invention is especially directed to a power operated mechanism for moving the superposed magazines upwardly and downwardly in the machine and also, when desired, for spreading or fanning the magazines apart so as to permit access to a magazine selected for replacement. The invention further contemplates a power operated mechanism for pivoting the superposed magazines so that matrices can be released from two adjacent magazines to a stationary assembler mechanism for composition in a single line, which operation is generally referred to as mixing. Thus it will be apparent that the present invention contemplates an improved mechanism for shifting, moving, and spreading the magazines of a linecasting machine to permit the ready access to matrices in all magazines provided on the machine. The invention is thus seen to be particularly desirable when the machine is to be operated automatically under control of a coded tape.

In accordance with the present invention, there is provided a magazine shift frame which is common to all the superposed magazines that can be accommodated in the machine. There is also provided a separate base frame for each magazine upon which the magazine is removably supported. Each base frame is pivotally supported upon the magazine shift frame so that it and the magazine supported thereon can be pivoted with respect to the magazine shift frame. The power operated mechanism for moving the magazines upwardly and downwardly to bring a selected magazine into alignment with the assembling and distributing mechanisms of the machine is a hydraulic apparatus that is controlled in its functioning by electrical means. Specifically, a hydraulic piston and cylinder device is connected between the magazine shift frame, which carries the superposed magazines upwardly and downwardly, and the machine frame itself. The admission of hydraulic fluid under pressure from a constantly operating pump to the piston and cylinder device and its exhaust therefrom is under the control of solenoid operated valves. By controlling the direction of fluid flow to the piston and cylinder device, the movement of the magazine shift frame either upwardly or downwardly may be effected to bring a selected magazine into the desired operative position. The same hydraulic device is used to spread or fan the magazines so that any one of them can be readily removed from the machine and replaced. This is accomplished by moving the shift frame to bring the magazine selected for replacement above the operative position, that is, to a position above the assembling and distributing mechanisms, latching the magazines superposed above the one selected for replacement in the thus elevated position, then moving the shift frame downwardly to carry the magazine to be removed to a position spaced from the magazines latched above it. The selected magazine is thereupon accessible for removal from its supporting base frame. Moreover, a separate piston and cylinder device is connected between the magazine shift frame and the base frame for the lowermost magazine. Here again the admission of hydraulic fluid under pressure from a constantly operating pump to the piston and cylinder device and its exhaust therefrom is under the control of solenoid operated valves. By controlling the direction of fluid flow to the piston and cylinder device, pivotal movement of the magazine base frames may be effected to bring the matrix discharge end of either of two adjacent magazines into alignment with the assembler front of the machine for purposes of mixing matrices from the two adjoining magazines. Features and advantages of this invention will be gained from the foregoing and from the description of a preferred embodiment of the invention which follows:

In the drawings:

FIG. 6 is a cross sectional view taken on line 6—6 of FIG. 1 showing the fanning latch and its operating solenoid;

FIG. 7 is a cross-sectional view taken on line 7—7 of FIG. 6;

FIG. 8 is a schematic diagram of the hydraulic circuit of the present invention.

Referring to the drawings, matrices are stored according to font in the superposed channeled magazines 10, 11, 12 and 13, four of which are shown, but of which a greater or lesser number may be employed if desired. The several magazines are removably supported on separate base frames 10a, 11a, 12a and 13a, respectively, which frames are each pivotally supported at their upper ends in an elevator frame 14 by pivot studs 19. Frame 14 is adapted to be moved upwardly and downwardly in a fixed machine frame 15 so that any selected magazine may be brought into operative relation with the assembler entrance 16 at the front of the machine and the channel entrance 17 of the distributing mechanism at the rear. There is provided for each of the magazines 10 to 13 a series of matrix releasing escapements 20 fastened in an escapement bar secured to the base frame for the particular magazine. When a magazine is brought into operative position, the escapements associated therewith are actuated under the control of the keyboard mechanism (not shown) in the usual way.

In the instant machine, each of the magazine base frames 10a to 13a is provided with a pair of outwardly protruding arms 21 integral therewith and, except those on the lowermost frame 13, each arm is provided with an adjustable downwardly projecting supporting screw 22. When the magazines are positioned normally, each screw 22 rests on the upper surface of the arm 21 directly therebelow. The arms 21 of lower base frame 13a rest directly upon adjustable banking screws 18 projecting from a transverse member 23 of the elevator frame 14 whereby the entire bank of superposed magazines is supported. Projecting outwardly from each of the arms 21 is an adjustable abutment 24 disposed in the plane of an alignment guide 25 projecting inwardly from the fixed machine frame 15. The screws 24 cooperate with the guides 25 to maintain the proper alignment of the magazines as they are elevated and lowered with respect to the machine frame.

The fixed machine frame 15 is also provided with a pair of obliquely disposed channel shaped rails 26 on which elevator frame rollers 27 run. The rollers are mounted on studs 30 fixed within a pair of U-shaped members 32 each one secured to opposite sides of elevator frame 14 and permit the latter to move upwardly and downwardly along the rails 26 with very little friction. The rollers on one side of frame 15 are provided with V-grooves 28 that cooperate with a track 29 formed on rail 26 to limit sidewise movement of the frame. Cover plates 31 are provided on the upper ends of members 32 and are fitted to move within the channel of rails 26. Moreover, the U-shaped members 32 enclose the rails 26 so that the rollers 27 operate in a closed channel which effectively keeps foreign objects from interfering with the movement of the elevator frame 14.

The elevator frame 14 is raised and lowered by means of a hydraulically operated mechanism comprising a cylinder 33 and piston 34 connected between the elevator frame 14 and the fixed machine frame 15. The upper end of the cylinder 33 is mounted on the machine frame 15 by means of a collar 35. The piston rod 36 extends upwardly through the machine frame, and at its upper end is fastened to the transverse member 23 of the elevator frame by means of the bolt 40. The cylinder 33 is tapped near its upper and lower ends in order to receive the fittings 41 and 42 through which hydraulic fluid can enter and leave the cylinder both above and below the piston. When fluid is admitted to the cylinder 33 below the piston 34, the latter will move upwardly through the cylinder to raise the elevator frame and the fluid above the piston will be evacuated from the cylinder. On the other hand, when fluid is admitted to the cylinder above the piston, the latter will move downwardly due to the force exerted by the fluid under pressure and the weight of the magazines so as to lower the elevator frame. The fluid below the piston, of course, will be evacuated from the cylinder. A box 38 mounted above the cylinder 33 contains five switches, the function of which will be described hereinafter with reference to FIG. 9.

Figure 1:
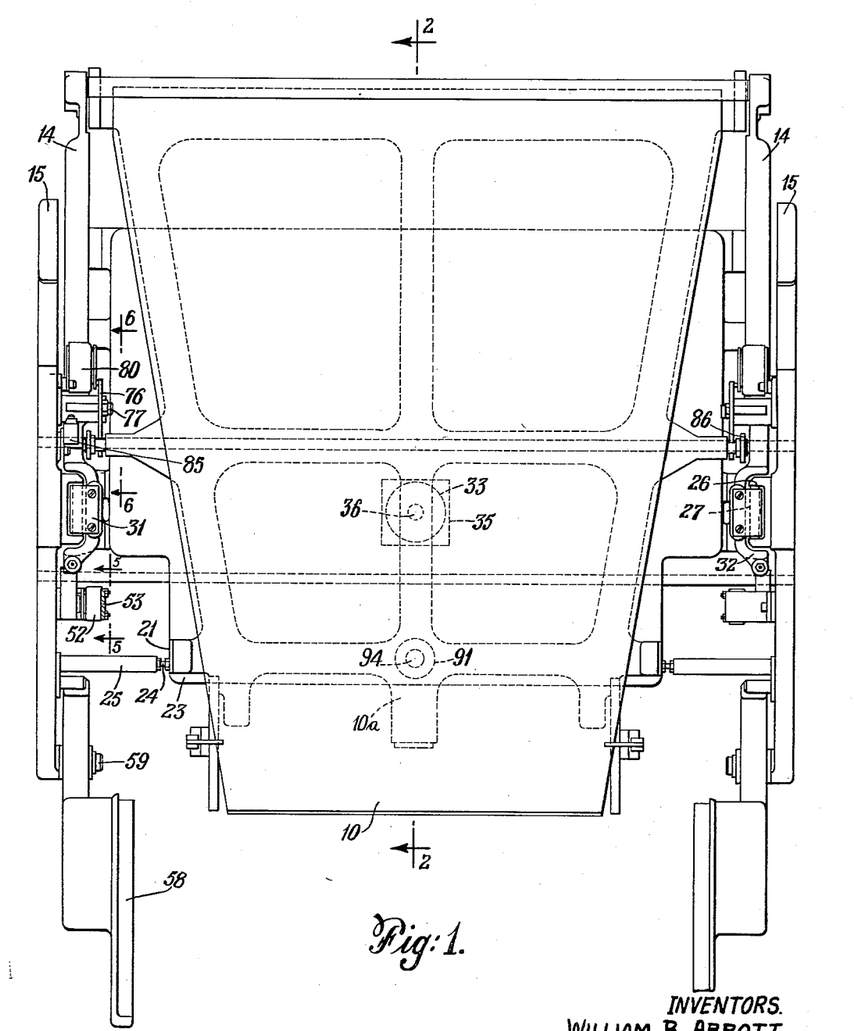
FIG. 1 is an oblique view of a portion of a typographical composing machine equipped with the present improvements.
Figure 2:
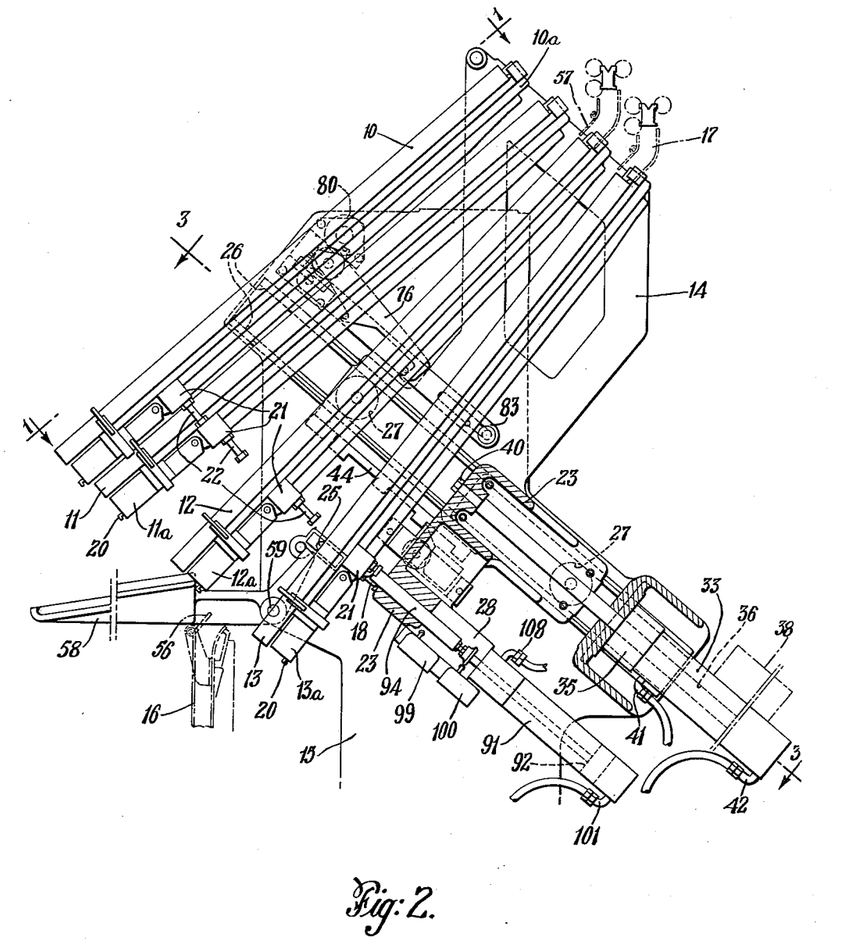
FIG. 2 is a vertical cross-sectional view taken on line 2—2 of FIG. 1 showing the magazines in fanned position.
Figure 3:
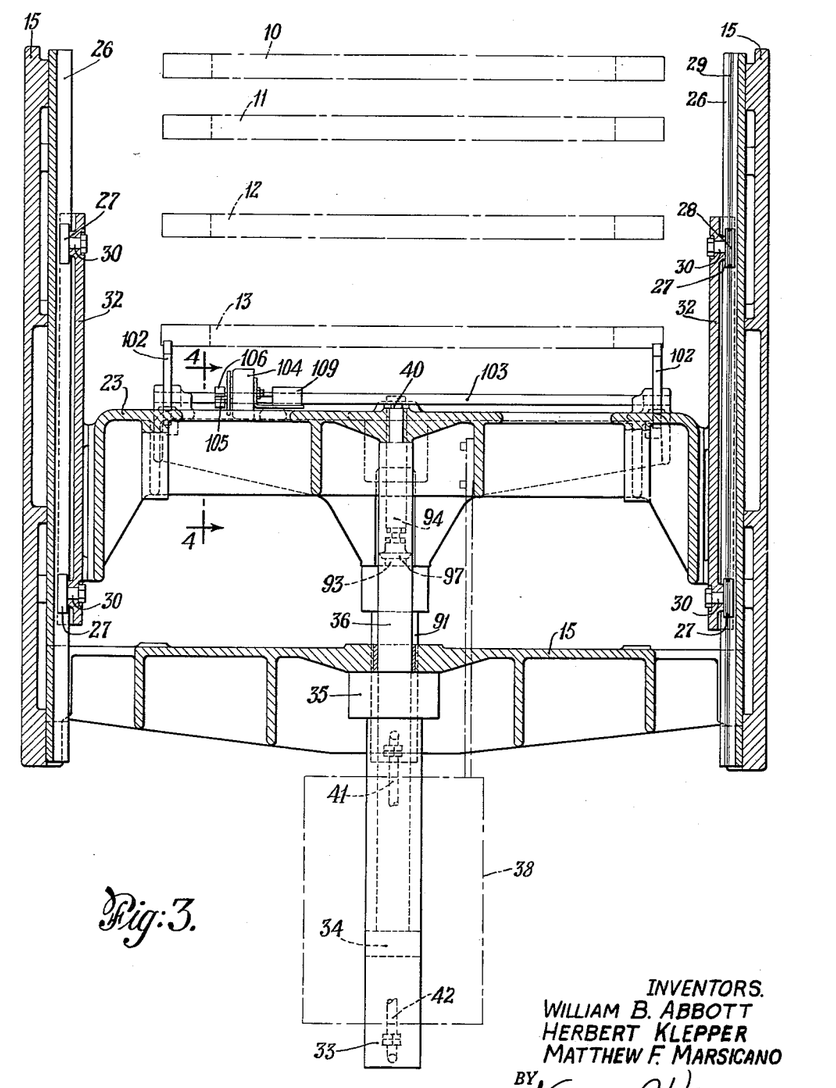
FIG. 3 is a cross-sectional view taken on line 3—3 of FIG. 2.
Figure 4:
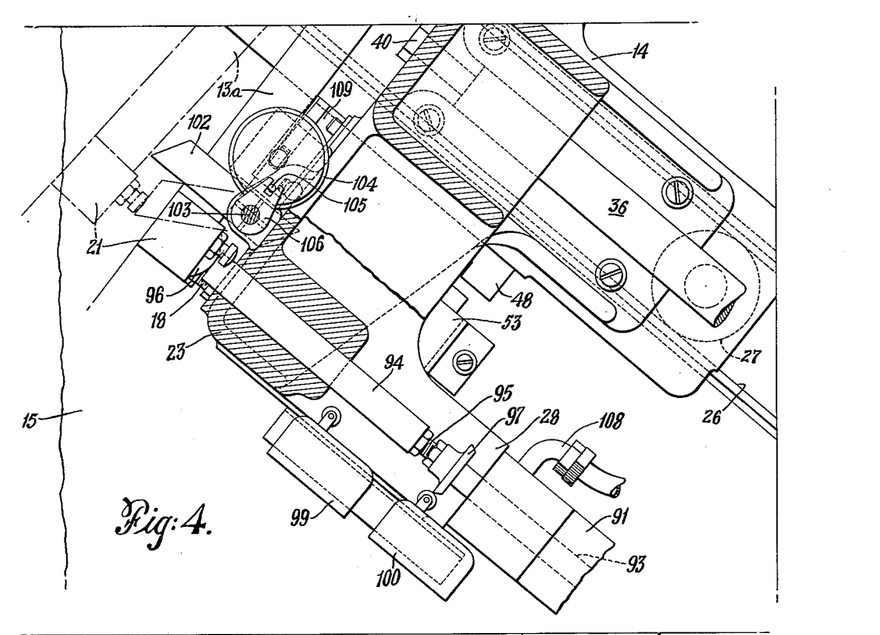
FIG. 4 is a cross-sectional view taken on line 4—4 of FIG. 3 showing the mix latch and its operating solenoid.
Figure 5:
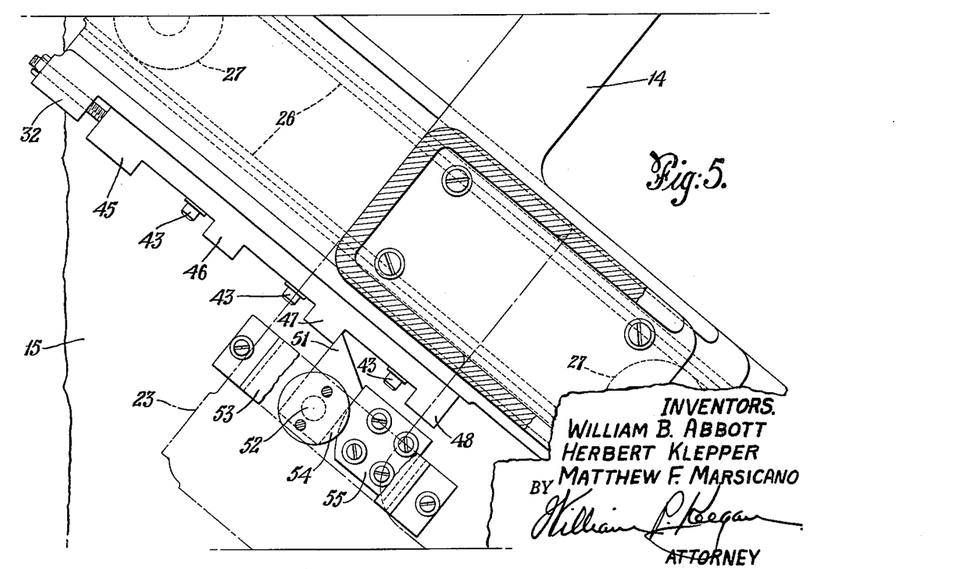
FIG. 5 is a cross-sectional view taken on line 5—5 of FIG. 1 showing the elevate latch and its operating solenoid.

FIGS. 1, 2 and 5 will be referred to for a description of the means for maintaining the elevator frame 14 in a particular relative position with respect to the fixed machine frame 15 so that any selected one of the four magazines 10–13 will be held in operative relation with the assembler entrance 16 and the channel entrance 17 of the distributing mechanism. A rack 44 having four teeth 45, 46, 47 and 48 projecting downwardly therefrom is secured to the lower surface of each of the members 32 of elevator frame 14 by means of the screws 43. Each of the teeth is associated with one of the matrix magazines, hence if the number of magazines which the machine is designed to handls were changed, the number of operative teeth on rack 44 would be changed accordingly. Directly below each of the racks 44, is a latching member 51 pivotally mounted on a stud 52 fixed in machine frame 15. The latching member is actuated by a rotary solenoid 54 which when energized pivots the latch 51 upwardly or in a counter-clockwise direction out of the path of rack 44. An abutment block 55 is fastened to the machine frame adjacent the latching member 51 to prevent movement of member 51 clockwise from its latching position shown in FIG. 5. When the solenoid 54 is deenergized, the latch 51 assumes its elevator frame latching position (shown in FIG. 5) wherein it is disposed in the path of travel of the rack 44 to engage one of teeth 45 to 48. The tooth corresponding to the selected, positioned magazine (the teeth 45 to 48 correspond to the magazines 10 to 13, respectively) rests upon the latch 51, and causes the latter to bear against the block 55 which thus supports the entire elevator frame and the four magazines. The arrangement of parts remains as just described until it is desired to raise or lower the elevator frame 14 to place a different magazine in operative position in the machine.

Before the elevator frame is moved to operatively position a selected magazine different from the one which is positioned in alignment with the assembler and channel entrances, it is first raised a short distance regardless of whether the newly selected magazine is above or below the then positioned magazine, in order to test for an unsafe condition at the assembler or channel entrance. An unsafe condition is one in which a matrix, for one reason or another, projects between the positioned magazine and either of the two entrances. If such a condition exists, the offending matrix or matrices will, during travel of the elevator frame, pivot the flap 56 at the assembler entrance or the flap 57 at the channel entrance and cut off all power to the electrical circuits (to be hereinafter described) whereupon the elevator will once again settle back upon the latches 51. If, conversely, no such unsafe condition exists, the solenoids 54, which have been energized, are free to pivot the latches 51 upwardly out of position to engage the teeth 45–48, since the elevator frame and racks 44 fastened thereto have been raised so that the rack teeth are out of the pivot path of the latches. The elevator frame is thus free to be moved upwardly or downwardly depending upon the relative position of the magazine selected to be aligned with the assembler and channel entrances. When the elevator frame reaches a point a short distance above the position which it will assume when the newly selected magazine is operatively positioned, the solenoids 54 are de-energized and the latches 51 fall back against the blocks 55, so that they may support the elevator frame 14 in its new position.

The complete hydraulic circuit for operating the elevator frame 14 may be seen schematically in FIG. 8. The circuit shown in solid lines is that for operating the elevator frame 14, whereas the circuit shown in dot-dash lines represents that for shifting the magazines in order to mix various fonts of matrices during composition, which mixing function and the apparatus therefor will be described hereinafter. When the magazines are at rest, the fluid is pumped by the continuously operated pump 60 from a reservoir 61 through the lines 67, 68 and 69 back to the reservoir. Due to the restrictor 63, some pressure is applied in the cylinder 33 through the connection 41, but there is no reaction inasmuch as the elevator frame is latched (as described above). The relief valve 64 serves to control the maximum pressure in the line by opening when the line pressure rises above a predetermined value. In order to raise the elevator frame 14, which as mentioned before is done each time that it is moved regardless of whether the frame is ultimately raised or lowered, the solenoid 65 is energized, by means of an electrical circuit to be hereinafter described, thus actuating the elevate valve 66, which latter valve then assumes the dotted line position in FIG. 8. Fluid is thereby directed from the pump 60, through the line 67, the valve 66, the line 72, the check valve 73, and the fitting 42 into the cylinder 33 whereupon the piston 34 is raised. As the piston rises, the fluid thereabove flows out the fitting 41, through the line 68, the valve 66, and the line 74 into the reservoir 61. After the piston 34 has risen the preferred distance, the solenoid 65 will either remain energized, whereupon the piston 34 will continue to move upwardly, or it will be deenergized. If the latter, the valve 66 will move back to its normal solid-line position and the piston will be moved downwardly by the combination of the weight of the magazines and the elevator frame, and the force exerted by the pressurized fluid which now flows into the cylinder through fitting 41.

Now that the apparatus for elevating and lowering the magazines in order to operatively position any selected one of them has been described, the apparatus for fanning the several magazines will be described. As is well known, the fanning operation is performed when one of the superposed magazines is to be removed from the machine and replaced by another, and the operation consists (as may be seen in FIGS. 2 and 6 in which the magazines are fanned to expose the magazine 12) of supporting the magazine or magazines above the one to be replaced, at an angle to their normal positions, and supporting the magazine to be replaced at a smaller angle to its normal position, whereby the latter magazine is exposed for convenient removal. Referring to FIGS. 1, 2, 6 and 7, each magazine base frame is provided with a stud 75 projecting outwardly from each side thereof. Disposed above these studs are two fan latches 76, one at each side of the machine, which are pivotally mounted on studs 77 fixed in the machine frame 15. Each latch 76 is formed with a pair of spaced apart hooks 83 and 84, projecting downwardly therefrom, and a bifurcated arm 81, which engages a pin 82 on a rotary solenoid 80 secured to the machine frame. The latches 76 are normally disposed out of the path of the studs 75 which move upwardly and downwardly with the elevator frame 14. However, when the solenoids 80 are energized, the latches pivot into the position shown in FIG. 6. As one of the latches 76 moves from one positon to another, it actautes a micro-switch 85, the purpose of which will be described hereinafter.

When it is desired to fan the magazines in order to expose, for example, the magazine 12, a "fan" push button switch at the front of the machine is depressed. In depressing this switch, a similar "elevate" push button switch is reset to an inoperative condition. Ordinarily, the "elevate" push button will be operative and the "fan" push button reset in an inoperative condition. With the "fan" push button depressed, the electrical circuits are conditioned as before to first raise the elevator frame 14 to test for an unsafe condition at the assembler and channel entrances. Thereafter, however, the elevator frame continues to move, either upwardly or downwardly as the case may be, to a position above the position which the elevator frame assumes when the magazine to be exposed is operatively positioned. At that point, the solenoids 80 are energized to pivot the latches 76 into operative position, and the solenoid 65 is deenergized to halt the flow of hydraulic fluid to the cylinder 33 below the piston 34. The elevator frame then begins to descend. Almost immediately, the studs 75 of the base frame 11a engage the hooks 83 of the latches 76 which latter thereby prevent the base frames 10a and 11a, and hence the magazines 10 and 11, from moving downwardly any further. As the elevator frame continues to move downwardly, the base frames 10a and 11a pivot with respect to the elevator frame about the pivot studs 19 at their upper ends. In time the studs 75 of the base frame 12a engage the hooks 84 and further downward movement of the magazine 12 is prevented. When the elevator frame 14 reaches a predetermined point above the position in which it is arranged when the magazine 12 is in operative position, the solenoids 54 are deenergized permitting the latches 51 to assume their latching position, and the solenoids 80 are deenergized, their energization no longer being needed to maintain the latches 76 in operative position since the studs 75 which engages the hooks 83 and 84 perform this function. The elevator frame then continues to descend until the tooth 47 of each rack 44 engages the latch 51 and halts the downward travel thereof. As may be seen clearly in FIG. 2, the magazines are now so spread apart that the selected magazine 12 may be conveniently removed from its base frame 12a and if desired replaced by another magazine. The actual removal of the magazines takes place in the conventional manner, the operation being facilitated by the magazine support arms 58 which are swingable about bolts 59 from an upright position within machine frame 15 to the position in which they are shown.

After removal and replacement of the magazine 12, the elevator frame 14, upon depression of the "elevate" push button and a button representing a selected magazine, moves upwardly so that the fan latches 76 can be pivoted back to their normal positions by springs (not shown). The elevator frame then moves either upwarly or downwardly to operatively locate the selected magazine in a matrix releasing position. A safety link 86 is pivotally mounted at its upper end adjacent the outward end of each of the studs 75 projecting from the magazine base frame 10a. The lower end of each link 86 is provided with an elongated slot 87 which accommodates a pin 90 projecting inwardly from the elevator frame 14. The purpose of the safety link is to prevent damage to the magazines in the event that after the fan latches 76 have been actuated and are engaged by the studs 75 of the proper base frames 10a—13a, the latches 51 do not, for one reason or another, assume their latching positions whereupon the elevator frame 14 would be free to continue moving downwardly until some damage to the magazines resulted. Such an occurrence is prevented by the link 86, since when the elevator frame descends a short distance past the position in which the latches 51 should have halted its travel, the pins 90 reach the bottom of the slot 87 in the link 86. At this point, further downward movement of the elevator frame is prevented and the entire weight of the frame and magazines is supported by the fan latches 76.

Up to this point, the present invention has been described with reference to a single distributor machine (i.e., a non-mixer machine); however, what has been said is also applicable to a mixer machine. Furthermore, the present invention contemplates mechanism for automatically shifting the bank of superposed magazines between an upper mix and a lower mix position whereby matrices from any two adjacent magazines may be mixed. Notice, in addition, that with the present arrangement a stationary assembler entrance may be employed rather than the more common swinging assembler front, since the magazines are pivoted about their upper ends to bring the discharge end of a selected magazine into alignment with the stationary assembler entrance.

With reference to FIGS. 2, 3, 4 and 8, the mixing apparatus will be readily understood. An auxiliary hydraulically operated mechanism comprising a cylinder 91 and piston 92 is connected to the elevator frame 14 below the cylinder 33. The upper end of the cylinder 91 is connected to a depending section 23a of the transverse portion 23 of the elevator frame, and the piston rod 93 extends past the upper end of the cylinder and through an adjustable screw 95 to bank on a rod 94 which is slidably disposed in the elevator frame portion 23. With the magazines in lower position, the upper end of the rod 94 is in contact with a button 96 mounted on the lower surface of the lowermost magazine base frame 13a in alignment with the rod, and a collar 97 mounted adjacent the upper end of the piston rod 93 operates a microswitch 100, the purpose of which will be described hereinafter. The cylinder 91 is tapped near its upper and lower ends in order to receive the fittings 101 and 103 through which hydraulic fluid can enter and leave the cylinder both above and below the piston. When fluid is admitted to the cylinder 91 below the piston 92, the latter moves upwardly through the cylinder and as a result the rod 94 rises in contact with the button 96 on the base frame 13a to pivot the magazine base frames 10a to 13a about their upper ends, with respect to the elevator frame 14, whereby the magazines are shifted to their upper position. The upper position of the base frame 13a is shown in dot-dash lines in FIG. 4. When the magazines leave the lower position, the collar 97 ceases to operate the switch 100, but when the upper position is reached, the collar operates the micro-switch 99, whose function will also be described hereinafter. Note that operation of the auxiliary piston and cylinder mechanism does not serve to move the elevator frame 14 with respect to the machine frame 15; rather only the magazines and their base frames are shifted.

In order to maintain the magazines in upper position, a pair of latches 102 are provided on a shaft 103 rotatably supported adjacent its ends in the section 23 of the elevator frame. A rotary solenoid 104 mounted on section 23 is provided with a pin 105 projecting from the solenoid armature that engages a bifurcated lever 106 attached to shaft 103. When the magazines are in upper position, the latches 102 are disposed in the position shown in dot-dash lines in FIG. 4, wherein they serve to support adjustable screws 107 projecting downwardly from the base frame 13a and thereby maintain the magazines in the position mentioned. When it is desired to shift the magazines to the lower position, the magazines are raised slightly and the solenoid 104 is energized to pivot lever 106. This movement of lever 106 oscillates shaft 103 to thereby pivot latches 102 to the position shown in solid lines in FIG. 4. The magazines then pivot downwardly until the supporting screws 22a projecting from the elevator frame 23 come to rest against base frame 13a in FIG. 2. Upon deenergization of the solenoid 104, the latches 102 are spring-urged through a small angle, in a counterclockwise direction in FIG. 4, but are stopped by the base frame 13a, in which position the latch remains until the magazines once again rise to upper position whereupon the latch snaps under the screw 107 and thereby supports the magazines. A micro-switch 109 mounted on the portion 23 of the elevator frame is operated by the solenoid 104, and performs a holding function for solenoid 104 as explained hereinafter.

The hydraulic circuit for performing the mixing operation is shown in FIG. 8 in dot-dash lines. When the magazines are to be shifted from lower to upper position, the solenoid 110 is energized to actuate the mix valve 111 which then assumes the dotted line position in FIG. 8. Fluid is thereby directed from the pump 60, through the line 67, the unactuated valve 66, the line 68, the valve 111, the line 112, the check valve 113, and the fitting 101 into the cylinder 91, whereupon the piston 92 is raised. As the piston rises, the fluid thereabove flows out of the cylinder through fitting 108 into the reservoir 61. When the magazines reach a position slightly above the upper position, the solenoid 110 will be deenergized thus moving the valve 111 back to its normal solid-line position, and the piston will move downwardly a short distance until the screw 107 contacts the spring-actuated latch 102. When the magazines are to be reshifted to lower position, the solenoid 10 will be energized for a moment in order to raise the magazines and permit the latch 102 to be pivoted out of latching position by solenoid 104. The solenoids are then deenergized and the weight of the magazines pushes the piston 92 downwardly through the cylinder 91, whereupon the fluid below the piston flows out the fitting 101, through the restrictor 114, the line 112, the valve 111, and the line 74, into the reservoir. The reduced pressure above the piston is sufficient to pull fluid from the reservoir, through fitting 108, into the cylinder.

If there is interference between the magazine and assembler entrance, safety flap 56 will be actuated during the initial magazine motion and will cancel the shifting signal.

Figure 9:
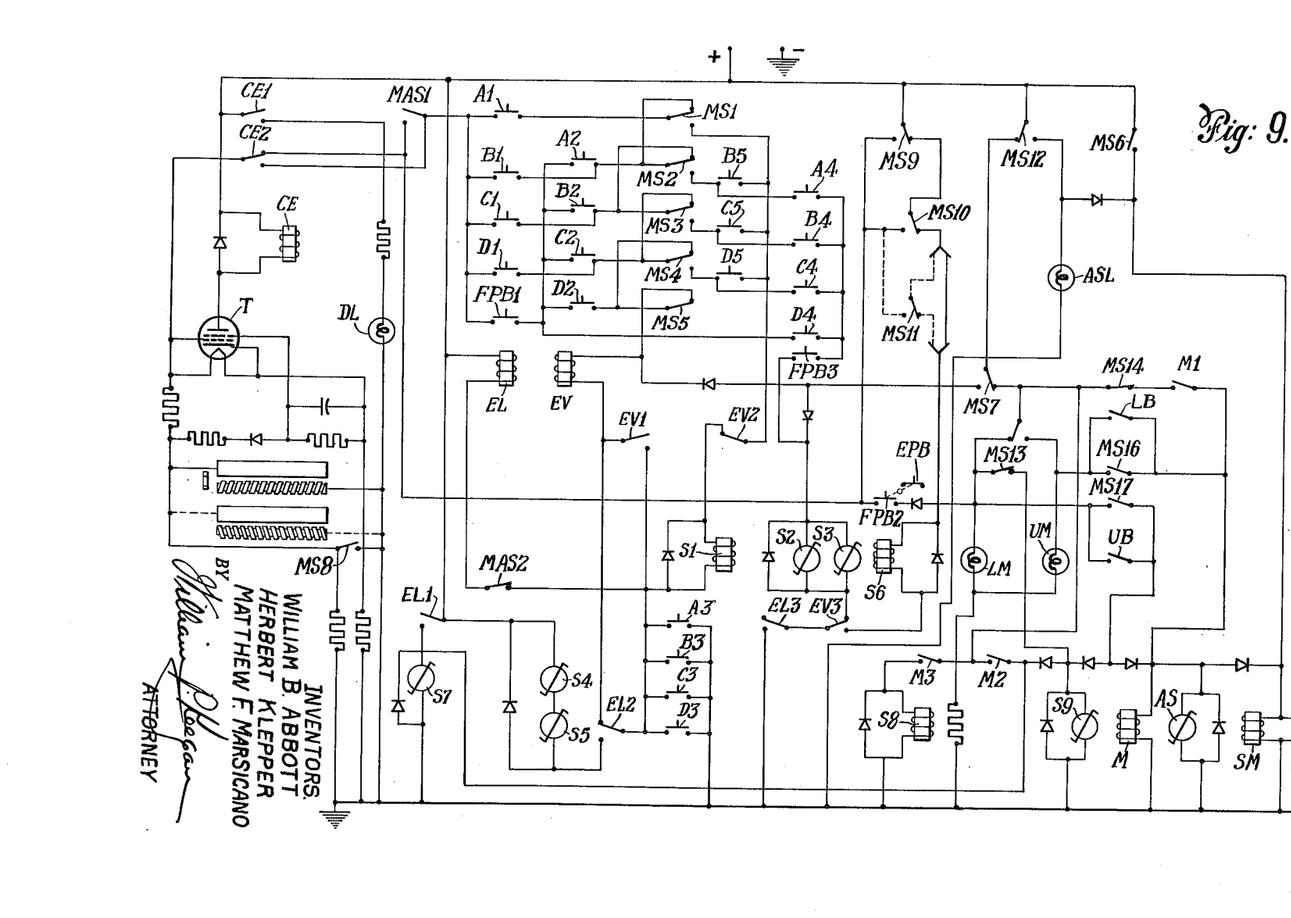
FIG. 9 is a schematic diagram of the electrical circuits for the present invention.

FIG. 9 is a wiring diagram of the electrical circuits employed to control the hydraulic operating mechanism and the latches heretofore described. In the diagram the following relays will be found:

CE—circuit energizing relay
EV—elevate valve relay
EL—elevate latch relay
M—mixer control relay Throughout the description which follows, these letters will be applied to the coils of the above designated relays. Also, with reference numerals appended thereto, they will be applied to the contacts of the relays. The relay contacts are shown in deenergized condition.

Furthermore, the following mechanically actuated switches are also located in the across-the-line diagram:

EPB—elevate push button
FPB—fan push button
A—push button for selecting magazine 10
B—push button for selecting magazine 11
C—push button for selecting magazine 12
D—push button for selecting magazine 13

Contacts of each of these push buttons are designated by the above letters with reference numerals appended thereto, and each of the contacts is shown separately in the circuit which it controls.

MS1, MS2, MS3, MS4—switches associated respectively with the magazines 10 to 13, and operated when the elevator frame is disposed a small distance, e.g., 5/8 of an inch, above the position it assumes when the magazine corresponding to the switch being actuated is operatively positioned.
MS5—a switch operated when the elevator frame is disposed a greater distance, e.g., 3 1/8 inches, above the position it assumes when magazine 13 is operatively positioned.
MS6—operated when the reed rack is moved out of the path of moving magazines.
MS16, MS17—a manual mixing switch operated by a rocker arm whereby MS16 selects the lower magazine of the mixing pair of magazines and MS17 selects the upper magazine.

In addition, the following solenoids appear in the wiring diagram

S1—push button switch release solenoid
S2–S3—correspond to solenoids 80
S4–S5—correspond to solenoids 54
S6—corresponds to valve solenoid 65
S7—reed rack solenoid
S8—corresponds to valve solenoid 110
S9—corresponds to solenoid 104

It should further be pointed out that the wiring diagram contains several optional circuits. These are designated by Y shaped symbols connected by both a solid line and a dot-dash line. The solid line indicates the connection for single distributor machines (non-mixers), and the dot-dash line indicates the alternative connection if the machine is a mixer model.

When power is supplied to the circuits, the tube T becomes conducting and energizes the coil of relay CE. If, however, a matrix is present on the distributor bar of the machine, or switch MS8 is closed because a matrix is located in the distributor box, since the grid of the tube T will be connected to ground, the tube will be non-conducting and the relay CE deenergized. As a result, contacts CE2 are separated and the elevating circuit cannot be energized. In other words, all matrices must be returned to their respective magazines before the magazines can be shifted. If the coil CE remains energized, the contacts CE1 are engaged thus lighting a green distributor safety lamp DL which indicates to the operator that a machine operation may be performed.

Assume now that the operator wishes to shift or elevate the magazines to bring the magazine 12, for example, into operative position. He first depresses the push button EPB and then depresses the push button C. Depression of push button EPB does not directly affect any electrical circuit, but mechanically resets push button FPB to an inoperative position. The push button remains mechanically latched in its depressed position. As will be described later, depression of button FPB resets push button EPB at the same time that button FPB is latched in the depressed position. Note that if the operator depressed the push button C before the lamp DL is lighted, i.e., before coil CE is energized, a circuit is completed from line W1, through the normally engaged contacts of CE2 through the push button release solenoid S1, and the contacts C3 of the push button C to ground whereby the solenoid S1 is energized. This solenoid is located inside the push button box at the front of the machine, and serves when it is energized to release any depressed push button. Hence, the push button C would be immediately released. If the coil CE is energized, however, the normally engaged contacts of CE2 will be separated to prevent the energization of solenoid S1. At the same time, the contacts of CE2 which engage complete a circuit from line W1 through the engaged contacts of CE2, contacts C1 of push button C, the normally engaged contacts of MS3, the normally engaged contacts of MS4, the normally engaged contacts of MS5, coil EV, the normally engaged contacts of EL2 and contacts C3 to ground. The resulting engagement of contacts EV1, which are in parallel with the contacts of EL2, provide a self-holding circuit for coil EV. A circuit also will be completed for relay coil EL from line W1, through coil EL, contacts MAS2 (MAS is a mechanical switch located in the push button box, the contacts MAS2 of which are separated when a push button is being depressed, but which are engaged as shown when the push button is latched in the depressed position), push button contacts C3 to ground. Energization of coil EL results in the engagement of contacts EL1 which complete a circuit to energize the reed rack solenoid S7. This solenoid serves to shift the reed rack of the machine out of the path of the magazines so that it causes no damage to, and is not damaged by, the magazines when they begin to move.

The engagement of the normally separated contacts EL3 and EV3 complete a circuit for the elevate valve solenoid S6, the circuit being traced from line W1, MS9, MS10, MS11 (on mixer machine models only) solenoid S6 and contacts EL3 and EV3 to ground. Solenoid S6 actuates the elevate valve 66, whereupon the elevator frame 14 begins to rise. As a further result of the energization of the coil EL, when the normally separated contacts EL2 engaged, a circuit was completed, through EL2 and push button contacts C3, to energize solenoids S4 and S5 which tend to urge the latches 51 out of latching position, so that by the time the elevator frame 14 has risen a small distance, e.g., 5/8 of an inch, each of the latches will be free to pivot out of the path of the rack 44.

While the elevator frame is rising the small distance, if an unsafe condition exists at the assembler entrance, e.g., a matrix protruding from the magazine, the flap 56 will be actuated thus operating the switch MS9 to break the circuit energizing the solenoid S6. Consequently hydraulic power is removed and the elevator frame is allowed to settle back to the position from which it started under the influence of gravity. Furthermore, a circuit is completed through MS9, solenoid S1, and contacts C3, to energize the solenoid S1, whereupon the push button C is released and the coils EV and EL are deenergized. The subsequent separation of contacts C3 interrupts the circuit for S4 and S5, in order that the latches 51 may drop into latching position. The elevator, therefore, settles back into the position it was in before the push button was depressed. If an unsafe condition exists at the channel entrance rather than the assembler entrance, the switch MS10 will be operated with the same results as just described. On mixer machines a switch MS11 on the second channel entrance performs the same function.

Assuming the absence of an unsafe condition, the operation is as follows: the selected magazine 12 is higher in the bank than the magazine which is operatively positioned, for example, magazine 13, than when the elevator frame has risen the small distance, e.g., 5/8 of an inch, the switch associated with the operatively positioned magazine, e.g., MS4, will be actuated, thus moving it from its upper to its lower contact. As a result, the circuit energizing the coil EV will be interrupted, whereupon the normally separated contacts EV3 open and the solenoid S6 is deenergized to permit the elevator frame to descend under the influence of gravity. When the elevator frame reaches a point 5/8 of an inch above the position it assumes when magazine 12 is operatively positioned, the switch MS3 is actuated, that is, the movable contact moves from the upper stationary contact which it normally engages to the lower stationary contact. This completes a circuit for energizing the solenoid S1 from line W1, through the normally separated contacts CE2, contacts C1, switch MS3, contacts C5, contacts EV2 (engaged since coil EV is deenergized), solenoid S1, and contacts C3 to ground. In consequence thereof push button C is released, opening contacts C3 and deenergizing the coil EL and the solenoids S4 and S5. Consequently, the latches 51 drop into latching position and hold the elevator frame when the magazine 12 is operatively positioned. The separation of contacts C3 interrupts the circuit for the push button release solenoid S1. Furthermore, the solenoid S7 is deenergized permitting the reed rack to return to normal position. Thus, it is seen that all of the circuit elements have been restored to their normal position as shown on the diagram.

If, on the other hand, the selected magazine 12 is lower in the bank than the magazine which is operatively positioned, for example, magazine 11, then when the elevator frame has risen 5/8 of an inch, the switch MS2 will be actuated with no effect on the circuit energizing the coil EV, hence the elevator will continue to rise until it is 5/8 of an inch above the position it assumes when the magazine 12 is operatively positioned. At this point, the switch MS3 is actuated to deenergize the coil EV, whereby the elevator frame ceases to rise. The other operations will be as above described and the elevator frame will settle down onto the latches 51.

Now assume that it is desired to fan the magazines in order to expose, for example, the magazine 12. In the first instance, the fan push button FPB is depressed. This action mechanically resets the elevate push button EPB but this action itself has no effect since the EPB button does not directly control any circuits. However, depression of button FPB causes the engagement of the contacts FPB1, FPB2 and FPB3 to condition the circuits for a fanning operation. The push button C is then depressed, and assuming no unsafe condition exists, the coil EV is energized through contacts FPB1, C2 and the switch MS4. Relay EL is also energized as in the magazine shifting operation. Relay EV remains energized until the carriage reaches a point, e.g., 3 1/8 inches above the position it assumes when the magazine 12 is operatively positioned. This result occurs since the elevator travel between magazine operative positions is normally 2 1/2 inches, and since the coil EV is being energized through switch MS4, which is actuated 5/8 of an inch above the operative position for magazine 13, the switch MS4 will not be actuated until the elevator frame reaches a distance 2 1/2 plus 5/8 inches or 3 1/8 inches above the operative position for magazine 12. When the switch MS4 is actuated, the coil EV is deenergized, hence the carriage ceases to rise. In addition, a circuit for energizing the fan latch solenoids S2 and S3 is completed from line W1, through contacts CE2, contacts FPB1, C2, switch MS4, contacts C4, contacts FPB3, the solenoids S2 and S3, contacts EV3 and EL3 to ground, whereupon the fan latches 76 pivot into operative position. One of latches 76 actuates MS7 which serves as holding switch to maintain S2 and S3 in energized condition. As the elevator frame descends, therefore, the magazine will be fanned to expose the magazine 12 as previously described. When the elevator frame is 5/8 inch above the position it assumes when the magazine 12 would be operatively positioned, the switch MS3 is actuated to complete a circuit through contacts CE2, Ci, MS3, C5, EV2, push button release solenoid S1 and contacts C3 to ground. Push button C is therefore released to deenergize relay EL and the release solenoid S1. Deenergization of relay EL and the resetting of the push button lead to the deenergization of the elevator latch solenoids S4 and S5. As a result latches 51 pivot into latching position to halt the downward movement of the elevator frame.

Note here that the magazines should not be in upper mix position when the fanning operation takes place, and to insure this, it may be seen that if a magazine selecting push button is depressed when the fan push button FPB is depressed for a fanning operation and the magazines are in upper mix position (wherein MS15 will be in the position shown in the diagram) a circuit will be completed to energize the solenoid S1 and immediately release the push button. This circuit is completed from line W1, switches MS12, MS7 and MS15, contacts FPB2, solenoid S1, and the appropriate push button contacts A3—D3 to ground.

A typical mixing operation will now be described. It will be recalled that mixing is always effected utilizing the magazine in normal operative alignment with the assembler entrance and the magazine located beneath such magazine. Thus, if magazine 11 is brought into normal operating position, mixing will take place using magazines 11 and 12. To put it another way, if it is desired to mix from magazines 11 and 12, the magazines are shifted to bring magazine 11 into normal operating position. By way of definition, the magazine normally aligned with the assembler entrance is said to be in the upper mix position. When the other magazine is pivoted into alignment with the assembler entrance the magazines are said to be in the lower mix position.

Referring to the wiring diagram, it will be observed that a circuit is traced through switches MS12, MS7, MS15 and the upper magazine lamp UM to illuminate the lamp and indicate that the magazines are in the upper mix position. If now, it is desired to bring the lower magazine into assembling position, switch MS16 is manually actuated to complete a circuit through switches MS12, MS7, MS15, MS16, relay coil M to ground. The resulting operation of the relay engages contacts M1, M2 and M3.

Contacts M3 complete a circuit for the mixer valve solenoid S8 which operates the valve to cause fluid to be pumped into the system to pivot the magazines as previously described. At the same time contacts M2 complete a circuit to energize the reed rack solenoid S7 and pivot the reeds out of the path of the moving magazines. Contacts M1 provide a self-holding circuit for relay coil M.

If a matrix protrudes from the magazine being shifted out of assembling position, switch MS12 will be actuated to arrest further pivoting of the magazines. The magazines continue to pivot until switch MS14 is actuated by collar 97 to deenergize the holding circuit for relay coil M. This switch is actuated after the magazines have been pivoted a small distance beyond the lower mix position so that when the mixing valve solenoid S8 is deenergized the magazines settle back down onto the mix latch 102 which had already snapped into latching position. At the same time switch MS15 is switched to its other position to illuminate lamp LM to indicate that the lower magazine is in assembling position.

If it is now desired to pivot the magazines back to the upper mix position, push button MS17 is depressed to complete a circuit through switches MS12, MS7, MS15 (in its other position), MS17, and relay coil M to ground. Operation of this relay has the same effect as before, namely, to start pivoting the magazines upwardly. However, when they are pivoted just a small distance, switch MS14 is actuated to interrupt the circuit for coil. Now when the magazines settle back, they continue to pivot downwardly until the upper magazine moves to assembling position. The reason for this is that the circuit completed through switch MS17 also energizes the mix latch solenoid S9 to pivot latch 102 out of the position it assumes to arrest the magazines in the lower mix position. A self-holding circuit is maintained for the solenoid by switch MS13 which is actuated by latch 102. When mixer position switch MS15 is returned to the position shown in the wiring diagram the self-holding circuit is interrupted to restore all the elements to the normal deenergized position.

When mixing is to be effected automatically by tape signals, all operations are exactly the same as described above, with the exception that to shift the magazines to lower mix position, the lower bail switch LB is operated, and to shift to upper mix position the upper bail switch UB is operated. These bail switches control the circuits in the same way that switches MS16 and MS17 do and hence it is not necessary to repeat the description of operations. In addition, the stop magnets SM of the automatic control unit are energized when a mixing function is called for, to stop feeding of the tape. An auxiliary solenoid AS may be provided to provide an extra fast arrest of the tape motion.

It is not intended to set forth all the variations that may be made, but it is contemplated that many of the features of the invention disclosed may be carried out in other ways and that many widely different embodiments of the invention can be made without departure from the spirit and scope of the invention. It is, therefore, intended that all matter contained in the above description or shown in the accompanying drawings shall be interpreted as illustrative and not in a limiting sense.

What is claimed is:

1. A matrix magazine shifting apparatus for a typographical composing machine having a plurality of matrix storage magazines shiftable as a unit to bring a selected magazine into operative position, said apparatus comprising an elevator frame on which the magazines are mounted, a hydraulic piston and cylinder mechanism connected to said frame and to a stationary part of the machine, hydraulic means for pumping fluid to said piston and cylinder mechanism whereby said frame is shifted relative to the stationary part of the machine, a plurality of means, one for each magazine in the machine, for selecting the magazine to be brought into operative position in the machine, means responsive to the operation of any one of said selecting means for detecting the existence of a condition that is not safe for the shifting of magazines, means responsive to the same operation of any one of said selecting means for shifting said elevator frame to bring a selected magazine into operative position, and means responsive to said detecting means for preventing the operation of said shifting means.

2. A matrix magazine shifting apparatus according to claim 1 including means for causing the magazines to be shifted upwardly a small distance regardless of the direction in which the magazines ultimately move whereby it can be determined whether or not it is safe to move the magazines to a selected position.

3. A matrix magazine shifting apparatus according to claim 1 including means responsive to actuation of any one of the magazine selecting means for moving the reed rack out of the path of the magazines.

4. A matrix magazine shifting apparatus according to claim 1 including means for mechanically latching the elevator frame with a selected magazine in operative position, means for unlatching the elevator frame so that said frame can be shifted to bring another selected magazine into operative position, and means operative during every magazine shift for moving the elevator frame upwardly a small distance regardless of the direction in which the elevator frame is ultimately to move prior to actuation of said unlatching means.

5. A matrix magazine shifting apparatus according to claim 4 wherein said latching means includes a rack-like member attached to the elevator frame and a member mounted on the machine frame for pivotable movement into the path of said rack-like member, and said unlatching means includes a solenoid for pivoting said member out of the path of said rack-like member.

6. A matrix magazine shifting apparatus according to claim 5 including means which, when a selected magazine is a small distance above its operative position aligned with the assembler entrance, deenergizes said solenoid to permit the latch member to return to a latching position.

7. A matrix magazine shifting apparatus according to claim 1 wherein said hydraulic mechanism is operative to shift the magazines upwardly but which permits the magazines to move downwardly under the influence of gravity.

8. A matrix magazine shifting apparatus according to claim 1 including means for determining the direction in which the magazines will ultimately move, latching means for supporting the magazines in an operative position, and means operative during every magazine shift operation to cause the magazines to move upwardly a small distance regardless of the ultimate direction of movement so that the latching means can be removed from supporting position.

9. In or for a typographical composing machine equipped with a plurality of superposed matrix magazines capable of movement as a unit in either of two directions in order to bring any selected one of the magazines into operative position, a hydraulic magazine elevating and lowering device comprising a closed fluid circulating system which includes a fluid reservoir, a continuously operated pump for circulating the fluid through the system, a cylinder and piston arrangement connected between the magazines and a fixed part of the machine, a solenoid operated valve for admitting fluid to the cylinder at one side of the piston or the other, depending upon whether the magazines are to be elevated or lowered, and means for simultaneously exhausting the cylinder at the opposite end of the piston to the fluid reservoir.

10. A matrix magazine shifting apparatus according to claim 1 wherein each magazine is supported upon a separate base frame that is pivotally connected at its upper end to the magazine shift frame and including means for fanning the magazines to expose a selected magazine for removal from its base frame.

11. A matrix magazine shifting apparatus according to claim 10 including fan latch means for supporting the magazines above the one selected for removal in one pivoted position with respect to the elevator frame and the selected magazine in another pivoted position with respect to the elevator frame whereby the selected magazine is exposed for removal.

12. A matrix magazine shifting apparatus according to claim 11 including means for raising the elevator frame to bring the magazine selected for removal above its normal operating position, means to pivot the latching means into a magazine supporting position, and means to lower the elevator frame whereby the latch means supports the magazines above the one selected for removal in one position and the magazine selected for removal in a second position.

13. A matrix magazine shifting apparatus according to claim 12 including latching means for supporting the elevator frame in the position it takes when the magazine selected for removal in a fanning operation is aligned with the assembler entrance in a normal magazine shifting operation.

14. A matrix magazine shifting apparatus for a typographical composing machine having at least two matrix magazines, a magazine frame for each of said magazines, a separate frame in which each of said magazine frames is pivotally supported at its upper end, at least two distributor mechanisms, and a single assembler entrance, said apparatus comprising a hydraulic piston and cylinder mechanism connected to said separate frame and the lowermost of the magazine frames, hydraulic means for pumping fluid to said piston and cylinder mechanism whereby the lower end of one of the two magazines is pivoted into alignment with the assembler entrance of the machine, electrical means for controlling the operation of said hydraulic means, and selecting means for determining the magazine that will be brought into alignment with the assembler entrance.

15. A matrix magazine shifting apparatus according to claim 14 wherein the hydraulic means is operative to pivot the magazines to bring the end of the lower of the two magazines into alignment with the assembler entrance.

16. A matrix magazine shifting apparatus according to claim 15 including latching means to support the lower magazine in alignment with the assembler entrance.

17. A matrix magazine shifting apparatus according to claim 14 including means responsive to a matrix protruding from the lower end of a magazine aligned with the assembler entrance for preventing the pivoting of the magazines.

18. A matrix magazine shifting apparatus according to claim 16 wherein the separate frame supports more than two magazine base frames, and including means for shifting said separate frame to bring a selected magazine into alignment with the assembler entrance whereby that magazine and the magazine located below said selected magazine can be pivoted by the hydraulic means.

19. A matrix magazine shifting apparatus according to claim 14 wherein the selecting means operate in response to control tape signals.

References Cited in the file of this patent
UNITED STATES PATENTS
2,307,071     Palastaras _______________ Jan. 5, 1943